United States Patent
Lai

(10) Patent No.: US 10,784,722 B2
(45) Date of Patent: Sep. 22, 2020

(54) BLUETOOTH HEADSET, CHARGING CABIN AND CHARGING SYSTEM THEREOF

(71) Applicant: Guangzhou U&I Technology Company Limited, Guangzhou (CN)

(72) Inventor: Shaobing Lai, Guangzhou (CN)

(73) Assignee: Guangzhou U&I Technology Company Limited (CN)

( * ) Notice: Subject to any disclaimer, the term of this patent is extended or adjusted under 35 U.S.C. 154(b) by 0 days.

(21) Appl. No.: 16/178,887

(22) Filed: Nov. 2, 2018

(65) Prior Publication Data

US 2020/0076234 A1    Mar. 5, 2020

(30) Foreign Application Priority Data

Sep. 4, 2018    (CN) .......................... 2018 1 1025394
Sep. 4, 2018    (CN) ...................... 2018 2 1440502 U

(51) Int. Cl.
| | |
|---|---|
| *H02J 7/00* | (2006.01) |
| *H02J 50/12* | (2016.01) |
| *H04R 5/04* | (2006.01) |
| *H02J 7/06* | (2006.01) |
| *H04R 5/033* | (2006.01) |

(Continued)

(52) U.S. Cl.
CPC ................ *H02J 50/12* (2016.02); *H02J 7/06* (2013.01); *H04R 1/1025* (2013.01); *H04R 5/033* (2013.01); *H04R 5/04* (2013.01); *H02J 2007/10* (2013.01); *H04R 2420/07* (2013.01)

(58) Field of Classification Search
CPC .......... H02J 50/12; H02J 7/06; H02J 2007/10; H02J 7/00036; H02J 2207/30; H02J 7/00034; H04R 5/04; H04R 5/033; H04R 1/1025; H04R 2420/07

See application file for complete search history.

(56) References Cited

U.S. PATENT DOCUMENTS

| | | | |
|---|---|---|---|
| 8,185,084 B2 * | 5/2012 | Terlizzi ................... | B21C 23/18 |
| | | | 455/343.5 |
| 9,769,558 B2 * | 9/2017 | Chandramohan .... | H04R 1/1058 |

(Continued)

FOREIGN PATENT DOCUMENTS

| | | |
|---|---|---|
| JP | S5030459 | 3/1975 |
| JP | S5447471 | 4/1979 |

(Continued)

*Primary Examiner* — Nghia M Doan
(74) *Attorney, Agent, or Firm* — McDonald Hopkins LLC

(57) ABSTRACT

Provided are a BLUETOOTH headset, a charging cabin and a charging system thereof. The BLUETOOTH headset includes: a headset charging interface circuit, a control circuit, a level shifting circuit and a chip module. The headset charging interface circuit includes a detecting terminal connected to a power supply voltage terminal of the BLUETOOTH headset through the control circuit. When the detecting terminal is connected to a detecting pin of the charging cabin, a voltage of the detecting terminal is shifted from a first voltage provided by the power supply voltage terminal to a second voltage provided by the detecting pin of the charging cabin to trigger the control circuit to output a first level signal to the level shifting circuit, and then the first level signal is shifted to a power-off signal through the level shifting circuit to trigger the chip module to power off the BLUETOOTH headset.

18 Claims, 7 Drawing Sheets

(51) Int. Cl.
*H04R 1/10* (2006.01)
*H02J 7/10* (2006.01)

(56) References Cited

U.S. PATENT DOCUMENTS

2009/0109639 A1* 4/2009 Li ..................... H04M 1/72527
361/748
2009/0252344 A1 10/2009 Mao et al.

FOREIGN PATENT DOCUMENTS

| | | |
|---|---|---|
| JP | 63047631 | 3/1988 |
| JP | H022201 | 1/1990 |
| JP | H0364117 | 3/1991 |
| JP | H05313768 | 11/1993 |
| JP | H10257138 | 9/1998 |
| JP | 2011521504 | 7/2011 |
| JP | 2016032170 | 3/2016 |
| JP | 2017147652 | 8/2017 |

* cited by examiner

US 10,784,722 B2

BLUETOOTH HEADSET, CHARGING CABIN AND CHARGING SYSTEM THEREOF

CROSS-REFERENCES TO RELATED APPLICATIONS

This application claims priority to a Chinese patent application No. 201811025394.0 filed on Sep. 4, 2018, disclosure of which is incorporated herein by reference in its entirety.

TECHNICAL FIELD

The present disclosure relates to an integrated circuit field, and in particular, relates to a BLUETOOTH headset, and a charging cabin and a charging system thereof.

BACKGROUND

With a rapid development of communication technologies, BLUETOOTH headsets have become more and more popular, bringing great convenience to people's life, work and study.

Currently, most BLUETOOTH headsets are usually powered by a built-in rechargeable battery. To ensure a normal use of the BLUETOOTH headset, the rechargeable battery in the BLUETOOTH headset needs to be charged. For example, when a user does not use the BLUETOOTH headset, the BLUETOOTH headset is placed in a charging cabin of the BLUETOOTH headset for charging. Specifically, after the BLUETOOTH headset is placed in the charging cabin, if a charging voltage provided by the charging cabin reaches a preset charging voltage such as 5V (Volt), the BLUETOOTH headset may be automatically switched off based on the charging voltage provided by the charging cabin, and enter the charging state; and when leaving the charging cabin, such as after being lifted from the charging cabin, the BLUETOOTH headset does not detect the 5V charging voltage provided by the charging cabin, and automatically performs operations such as switching on, pairing, connecting, and the like. However, when the charging voltage provided by the charging cabin is lower than the preset charging voltage, for example, if the battery of the charging cabin is dead, the BLUETOOTH headset cannot be automatically switched off after being placed in the charging cabin; or, the BLUETOOTH headset placed in the charging cabin and with a powered built-in battery frequently performs operations such as switching off, switching on, pairing, connecting, and the like, which makes a smart terminal, in use by the user, such as a mobile phone or a tablet connected to the BLUETOOTH headset automatically switch audio to the BLUETOOTH headset mode and brings unnecessary trouble to the user, such as requiring the user to manually power off the BLUETOOTH headset, disconnect a connection between smart terminals and the BLUETOOTH headsets, and the like.

SUMMARY

This disclosure provides a BLUETOOTH headset, and a charging cabin and a charging system thereof, so as to solve the problem that the BLUETOOTH headset is powered on accidently when a charging voltage provided by the charging cabin is insufficient.

In a first aspect, an embodiment of the present disclosure provides a BLUETOOTH headset including: a headset charging interface circuit, a control circuit, a level shifting circuit and a chip module;

where the headset charging interface circuit includes a detecting terminal connected to a power supply voltage terminal of the BLUETOOTH headset through the control circuit and connectable to a detecting pin of a charging cabin;

when the detecting terminal is not connected to the detecting pin of the charging cabin, a voltage of the detecting terminal is a first voltage provided by the power supply voltage terminal;

when the detecting terminal is connected to the detecting pin of the charging cabin, the voltage of the detecting terminal is shifted from the first voltage to a second voltage provided by the detecting pin to trigger the control circuit to output a first level signal to the level shifting circuit; and the level shifting circuit is configured to shift the first level signal to a power-off signal, transmit the power-off signal to the chip module, and trigger the chip module to power off the BLUETOOTH headset according to the power-off signal.

In a second aspect, an embodiment of the present disclosure further provides a charging cabin of a BLUETOOTH headset, including: a charging interface of the charging cabin, a charging management circuit, and a battery;

where the charging interface of the charging cabin includes a detecting pin, a power supply pin and a ground pin, where the detecting pin is configured to connect to a detecting terminal of the BLUETOOTH headset, the power supply pin is configured to connect to a first charging terminal of the BLUETOOTH headset, and the grounding pin is configured to connect to a second charging terminal of the BLUETOOTH headset; and a terminal of the charging management circuit is connected to a positive electrode of the battery, and another terminal of the charging management circuit is connected to the power supply pin, so as to output a charging voltage to the power supply pin when the detecting pin is connected to the detecting terminal of the BLUETOOTH headset.

In a third aspect, an embodiment of the present disclosure further provides a charging system of a BLUETOOTH headset, including: the BLUETOOTH headset and a charging cabin, where the BLUETOOTH headset includes the BLUETOOTH headset described in the first aspect; the charging cabin includes the charging cabin described in the second aspect; and when a detecting pin of the charging cabin is connected to a detecting terminal of the BLUETOOTH headset, a charging management circuit of the charging cabin outputs a charging voltage to a power supply pin of the charging cabin.

In the present disclosure, after the voltage of the detecting terminal of the headset charging interface circuit shifts from the first voltage to the second voltage provided by the detecting pin of the charging cabin, the power-off signal may be output to the chip module through the control circuit and the level shifting circuit in order for the chip module to power off the BLUETOOTH headset, thereby solving the problem that the BLUETOOTH headset is powered on accidently when the charging voltage provided by the charging cabin is insufficient in the related art.

DETAILED DESCRIPTION

Figure 1:
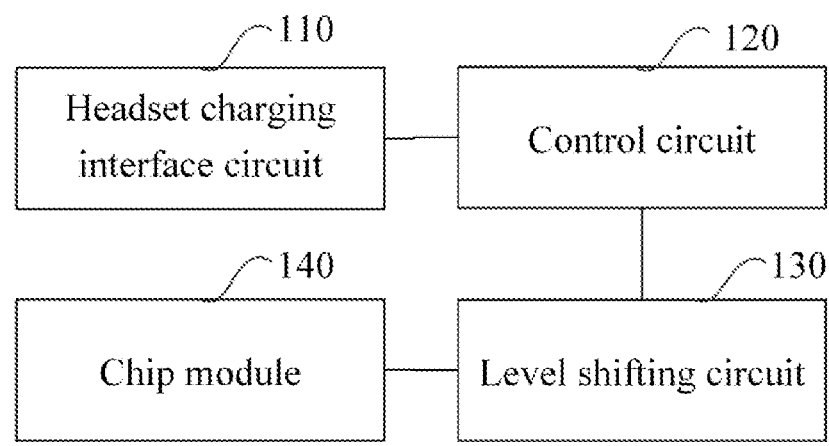
FIG. 1 is a structural block diagram of a BLUETOOTH headset provided by the present disclosure.

The present disclosure will be further described in detail in conjunction with the drawings and embodiments. It should be understood that, the embodiments set forth below are intended to illustrate and not to limit the present disclosure. Additionally, in order to facilitate description, only part, not all, of structures related to the present disclosure are illustrated in the drawings.

Referring to FIG. 1, it is a structural block diagram of a BLUETOOTH headset provided by the present disclosure. The BLUETOOTH headset may include: a headset charging interface circuit 110, a control circuit 120, a level shifting circuit 130 and a chip module 140.

The headset charging interface circuit 110 may include a detecting terminal, the detecting terminal may be connected to a power supply voltage terminal VBAT of the BLUETOOTH headset through the control circuit 120 and connectable to a detecting pin of a charging cabin. Specifically, when the detecting terminal is not connected to the detecting pin of the charging cabin, a voltage of the detecting terminal is a first voltage provided by the power supply voltage terminal VBAT, and when the detecting terminal is connected to the detecting pin of the charging cabin, the voltage of the detecting terminal is shifted from the first voltage to a second voltage provided by the detecting pin to trigger the control circuit 120 to output a first level signal to the level shifting circuit 130. The level shifting circuit 130 may be configured to shift the first level signal output by the control circuit 120 to a power-off signal, transmit the power-off signal to the chip module 140, thereby triggering the chip module 140 to power off the BLUETOOTH headset according to the power-off signal.

In summary, in the present disclosure, the detecting terminal of the headset charging interface circuit 110 is connected to the detecting pin of the charging cabin, for example, after the BLUETOOTH headset is placed in the charging cabin, the detecting terminal of the headset charging interface circuit 110 of the BLUETOOTH headset may be connected to the detecting pin of the charging cabin through a connector. The voltage of the detecting terminal is shifted from the first voltage provided by the power supply voltage terminal VBAT to the second voltage provided by the detecting pin of the charging cabin, thereby triggering the control circuit 120 in the BLUETOOTH headset to output the first level signal to the level shifting circuit 130. Then, the first level signal may be shifted to a power-off signal through the level shifting circuit 130 and the power-off signal is transmitted to the chip module 140 of the BLUETOOTH headset, to trigger the chip module 140 to power off the BLUETOOTH headset according to the power-off signal, such as performing a switching off action, achieving an automatic power-off of the BLUETOOTH headset.

It can be seen that, in the present disclosure, after the voltage of the detecting terminal of the headset charging interface circuit 110 is shifted from the first voltage to the second voltage provided by the detecting pin of the charging cabin, the power-off signal may be output to the chip module 140 through the control circuit 120 and the level shifting circuit 130, so that the chip module 140 is configured to power off the BLUETOOTH headset, thereby solving the problem that the BLUETOOTH headset cannot be automatically switched off after being placed in the charging cabin when the charging voltage provided by the charging cabin is lower than the preset charging voltage in the related art, that is, solving the problem that the BLUETOOTH headset is accidently powered on when the charging voltage provided by the charging cabin is insufficient.

In one embodiment, the first voltage provided by the power supply voltage terminal VBAT may be higher than the second voltage provided by the detecting pin of the charging cabin. For example, the first voltage provided by the power supply voltage terminal VBAT may be a logic high-level voltage, such as a logic high-level voltage of 5V. The second voltage provided by the detecting pin of the charging cabin may be a logic low-level voltage, such as a logic low-level voltage of 0V or the like in a case where the detecting pin of the charging cabin is connected to a reference ground.

As an example of the present disclosure, in a case where the first voltage provided by the power supply voltage terminal VBAT is the logic high-level voltage and the second voltage provided by the detecting pin of the charging cabin is the logic low-level voltage, when the detecting terminal of the headset charging interface circuit 110 is not connected to the detecting pin of the charging cabin, for example, after the BLUETOOTH headset leaves the charging cabin, the voltage of the detecting terminal of the headset charging interface circuit 110 is the logic high-level voltage. When the detecting terminal of the headset charging interface circuit 110 is connected to the detecting pin of the charging cabin, the voltage of the detecting terminal of the headset charging interface circuit 110 is pulled down by the voltage of the detecting pin of the charging cabin, that is, the voltage of the detecting terminal of the headset charging interface circuit 110 is shifted from the logic high-level voltage to the logic low-level voltage For example, after the BLUETOOTH headset is placed in the charging cabin, the detecting pin of the charging cabin may be connected to the detecting terminal of the headset charging interface circuit 110 through the connector, so that the voltage of the detecting terminal is shifted from the logic high-level voltage to the logic low-level voltage, thereby triggering the control circuit 120 to output the first level signal to the level shifting circuit 130. Specifically, when detecting that the voltage of the detecting terminal is shifted from the logic high-level voltage to the logic low-level voltage, the control circuit 120 may output a logic high-level signal, and transmit the logic high-level signal as the first level signal to the level shifting circuit 130, thereby triggering the level shifting circuit 130 to output a power-off signal to the chip module 140, so that the chip module 140 is configured to perform a switching off action when the power-off signal is detected by the chip module 140, that is, switching off the BLUETOOTH headset.

It can be seen that, in this example, after the voltage of the detecting terminal of the headset charging interface circuit 110 is pulled down to the logic low-level voltage provided by the detecting pin of the charging cabin, the power-off signal may be output to the chip module 140 through the control circuit 120 and the level shifting circuit 130, so that the chip module 140 may power off the BLUETOOTH headset according to the power-off signal and the BLUETOOTH headset placed in the charging cabin may also be automatically switched off when the charging cabin is insufficient in power. That is, the problem that the BLUETOOTH headset cannot be automatically switched off limited by the charging voltage in the charging cabin has been solved, and then the problem caused by a connection of the BLUETOOTH headset placed in the charging cabin and a smart terminal is avoided. Therefore, the stability of the BLUETOOTH headset during the BLUETOOTH headset is used by the user has been ensured and the user experience is improved.

Of course, in the present disclosure, when leaving the charging cabin, the BLUETOOTH headset may also be automatically switched on, thereby avoiding the trouble of being manually switched on by the user and simplifying the user operation. In one embodiment, the control circuit 120 may be configured to detect the voltage of the detecting terminal, and outputting a second level signal to the level shifting circuit 130 when the detected voltage of the detecting terminal is the first voltage. Specifically, when the voltage of the detecting terminal is the first voltage provided by the power supply voltage terminal VBAT, for example after the BLUETOOTH headset leaves the charging cabin, the detecting terminal of the headset charging interface circuit is disconnected from the detecting pin of the charging cabin, and the voltage of the detecting terminal may be shifted from the second voltage provided by the detecting pin of the charging cabin to the first voltage provided by the power supply voltage terminal VBAT, thereby triggering the control circuit 120 to output the second level signal to the level shifting circuit 130 to trigger the level shifting circuit 130 to output a power-on signal to the chip module 140. The level shifting circuit 130 may be configured to shift the second level signal to the power-on signal and transmitting the switch-on signal to the chip module 140, thereby triggering the chip module 140 to start up the BLUETOOTH headset according to the power-on signal to achieve the automatic power on of the BLUETOOTH headset.

The chip module 140 may be configured to start up the BLUETOOTH headset according to the power-on signal when the BLUETOOTH headset is switched off. For example, after receiving the power-on signal, the chip module 140 may detect whether the BLUETOOTH headset is currently in a power-off state to determine whether to perform a power-on action based on the power-on signal. If the BLUETOOTH headset is detected to be currently in the power-off state, that is, when the BLUETOOTH headset is powered off, the BLUETOOTH headset is powered on according to the power-on signal, that is, the power-on action is performed, to achieve the automatic power on of the BLUETOOTH headset. In one embodiment, when the BLUETOOTH headset is detected to be in a non-power-off state, such as in a power-on state, the power-off signal may be ignored, or, other actions may be performed based on the power-on signal, etc., which is not specifically limited in the present disclosure.

Figure 2:
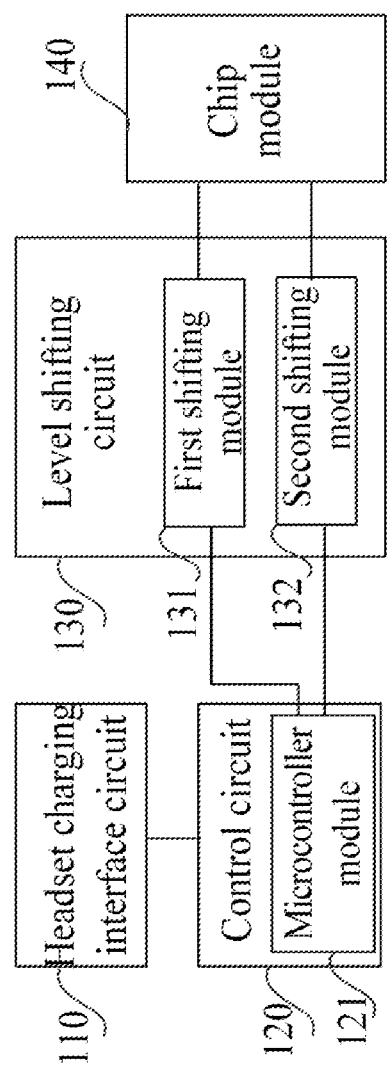
FIG. 2 is a structural block diagram of a BLUETOOTH headset according to an embodiment of the present disclosure.

In an embodiment of the present disclosure, the above-mentioned control circuit 120 may be a microcontroller control circuit, and may specifically include a microcontroller module 121. The level shifting circuit 130 may specifically include a first shifting module 131 and a second shifting module 132. As shown in FIG. 2, a terminal of the first shifting module 131 is connected to a first output terminal of the microcontroller module 121 and another terminal of the first shifting module 131 is connected to a first receiving pin of the chip module 140, so as to shift the first level signal outputted by the first output terminal of the microcontroller module 121 to the power-off signal and transmit the power-off signal to the first receiving pin of the chip module 140. A terminal of the second shifting module 132 is connected to a second output terminal of the microcontroller module 121 and another terminal of the second shifting module 132 is connected to a second receiving pin of the chip module 140, so as to shift the second level signal output by the second output terminal of the microcontroller module 121 to the power-on signal and transmit the power-on signal to the second receiving pin of the chip module 140.

Specifically, when the BLUETOOTH headset is placed in the charging cabin for charging, the detecting pin of the charging cabin may be connected to the detecting terminal of the headset charging interface circuit 110 of the BLUETOOTH headset, so that the voltage of the detecting terminal of the headset charging interface circuit 110 is shifted from the first voltage to the second voltage, and the detecting terminal of the headset charging interface circuit 110 may be connected to the microcontroller module 121 in the control circuit 120. When detecting that the voltage of the detecting terminal is shifted from the first voltage to the second voltage, the microcontroller module 121 may output the first level signal to the first shifting module 131 in the level shifting circuit 130 through the first output terminal to trigger the first shifting module 131 to output the power-off signal to the chip module 140, so that according to the power-off signal, the chip module 140 may power off the BLUETOOTH headset and enter into a charging state. When the BLUETOOTH headset is lifted from the charging cabin, the detecting terminal of the headset charging interface circuit 110 may be connected to the power supply voltage terminal VBAT through the control circuit 120, such as a resistor, a wire, etc. in the control circuit 120, so that the voltage of the detecting terminal may be pulled up by the voltage of the power supply voltage terminal VBAT. That is, the voltage of the detecting terminal of the headset charging interface circuit 110 may be shifted from the second voltage to the first voltage, thereby triggering the microcontroller module 121 to generate the power-on signal of the BLUETOOTH headset. The microcontroller module 121 may output the second level signal to the second shifting module 132 in the level shifting circuit 130 through the second output terminal, so as to trigger the second shifting module 132 to output the power-on signal to the chip module 140, so that according to the power-on signal, the chip module may start up the BLUETOOTH headset to achieve the automatic power on of the BLUETOOTH headset and then perform actions such as automatic pairing, connecting, etc. to establish a communication connection relationship between the BLUETOOTH headset and other devices, so that the BLUETOOTH headset may communicate with other devices, such as accepting and/or transmitting audio data, etc.

Figure 3:
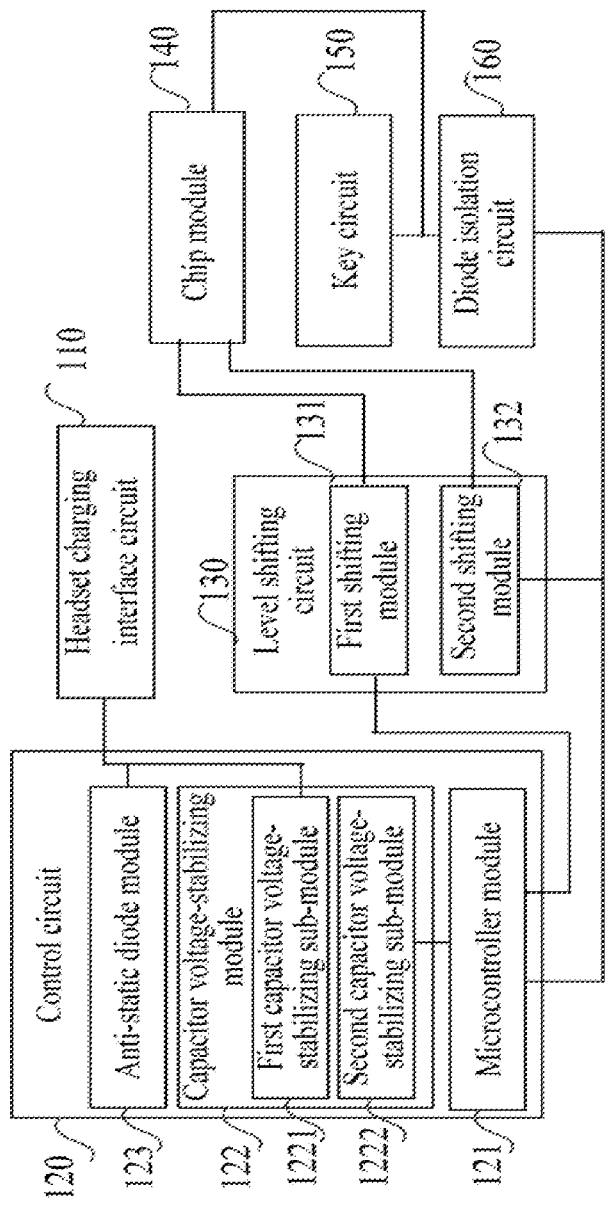
FIG. 3 is a structural block diagram of a BLUETOOTH headset according to another embodiment of the present disclosure.

In the present disclosure, optionally, the control circuit 120 further includes a capacitor voltage-stabilizing module 122 and an anti-static diode module 123. As shown in FIG. 3, a terminal of the anti-static diode module 123 is connected to the detecting terminal DETECTOR PORT of the headset charging interface circuit 110, and another terminal of the anti-static diode module 123 is connected to the reference ground of the BLUETOOTH headset. The anti-static diode module 123 may include one or more anti-static diodes, such as electrostatic discharge (ESD) diodes, to effectively prevent external static electricity from damaging the BLUETOOTH headset. The capacitor voltage-stabilizing module 122 may include a first capacitor voltage-stabilizing sub-module 1221 and a second capacitor voltage-stabilizing sub-module 1222. A terminal of the first capacitor voltage-stabilizing sub-module 1221 is connected to the detecting terminal DETECTOR PORT of the headset charging interface circuit and another terminal of the first capacitor voltage-stabilizing sub-module 1221 is connected to the reference ground of the BLUETOOTH headset, so as to stabilize the voltage of the detecting terminal DETECTOR PORT. A terminal of the second capacitor voltage-stabilizing sub-module 1222 is connected to the reference ground of the BLUETOOTH headset, and another terminal of the second capacitor voltage-stabilizing sub-module 1222 is connected to the power supply voltage terminal VBAT of the BLUETOOTH headset and a power supply input terminal VDD of the microcontroller module 121, so as to stabilize a voltage of the power supply input terminal of the microcontroller module.

For example, the first capacitor voltage-stabilizing sub-module 1221 may include one or more capacitors, specifically used for preventing instantaneous jitter of the headset charging interface circuit 110 and a charging interface of the charging cabin, thereby preventing the instantaneous jitter from influencing the voltage of the detecting terminal DETECTOR PORT so as to achieve a purpose of stabilizing the voltage of the detecting terminal of the headset charging interface circuit 110.

Of course, the second capacitor voltage-stabilizing sub-module 1222 may also include one or more capacitors, which is not specifically limited by the embodiment of the present disclosure. The capacitor in the second capacitor voltage-stabilizing sub-module 1222 may be connected to the power supply input terminal VDD of the microcontroller module 121, and may be used as a decoupling capacitor of the power supply input terminal VDD of the microcontroller module 121 to enhance the stability of the microcontroller module 121. The power supply input terminal VDD of the microcontroller module 121 may be directly connected to the power supply voltage terminal VBAT of the BLUETOOTH headset.

In an embodiment of the present disclosure, the BLUETOOTH headset may further include: a key circuit 150 and a diode isolation circuit 160. As shown in FIG. 3, a terminal of the diode isolation circuit 160 is connected to the second shifting module 132, and another terminal of the diode isolation circuit 160 is connected to the key circuit 150 and a third receiving pin of the chip module, thereby preventing the key circuit from performing incorrect actions to the chip module 140 when the key circuit performs a level shifting action on the second shifting module 132 after receiving a key action inputted by the user, so as to ensure that the chip module 140 can normally respond to the key action inputted by the user and meet the operation requirement of the user. A terminal of the key circuit 150 is connected to the power supply voltage terminal VBAT of the BLUETOOTH headset, and another terminal of the key circuit 150 is connected to the third receiving pin of the chip module 140, so that the chip module may detect that the key operation is inputted by the user through using the key circuit 150, and then according to the detected operation, corresponding actions are performed to meet the user's operation requirement and improve the user experience.

In a specific implementation, optionally, the first shifting module 131 in the present disclosure includes a first transistor Q1, where a first terminal of the first transistor Q1 may be connected to the first output terminal of the microcontroller module 121, a second terminal of the first transistor Q1 may be connected to the first receiving pin of the chip module 140, and a third terminal of the first transistor Q1 is connected to the reference ground of the BLUETOOTH headset. After the first level signal outputted from the first output terminal of the microcontroller module 121 is transmitted to the first terminal of the first transistor Q1, the first transistor Q1 is turned on, so that the third terminal of the first transistor Q1 generates a power-off signal which may be transmitted to the first receiving pin of the chip module 140. The chip module 140 may detect the power-off signal through the first receiving pin, and then may perform the power off action based on the power-off signal to achieve the automatic power off of the BLUETOOTH headset and simplify operations. The first transistor Q1 may be an N-Metal-Oxide-Semiconductor (NMOS) transistor, or another type of transistor, such as a triode or the like, which is not limited in the embodiment of the present disclosure.

In addition, the second shifting module 132 in the present disclosure may include a second transistor Q2 and a current-limiting resistor R1. A terminal of the current-limiting resistor R1 may be connected to the first output terminal of the microcontroller module 121, and another terminal of the current-limiting resistor R1 may be connected to a first terminal of the second transistor Q2. A second terminal of the second transistor Q2 may be connected to the second receiving pin of the chip module 140, and a third terminal of the second transistor Q2 may be connected to the reference ground of the BLUETOOTH headset. Specifically, the second output terminal of the microcontroller module 121 outputs the second level signal which may be transmitted to the first terminal of the second transistor Q2 through the current-limiting resistor R1, so that the second transistor Q2 is turned on. After the second transistor Q2 is turned on, the second terminal of the second transistor Q2 generates a power-on signal, so that the second receiving pin of the chip module 140 may detect the power-on signal, thereby triggering the chip module 140 to perform the power on action according to the power-on signal to achieve the automatic power on of the BLUETOOTH headset and simplifies operations. It should be noted that, the second transistor Q2 may be the NMOS transistor, or another type of transistor, such as a triode or the like, which is not limited in the embodiment of the present disclosure.

Figure 4:
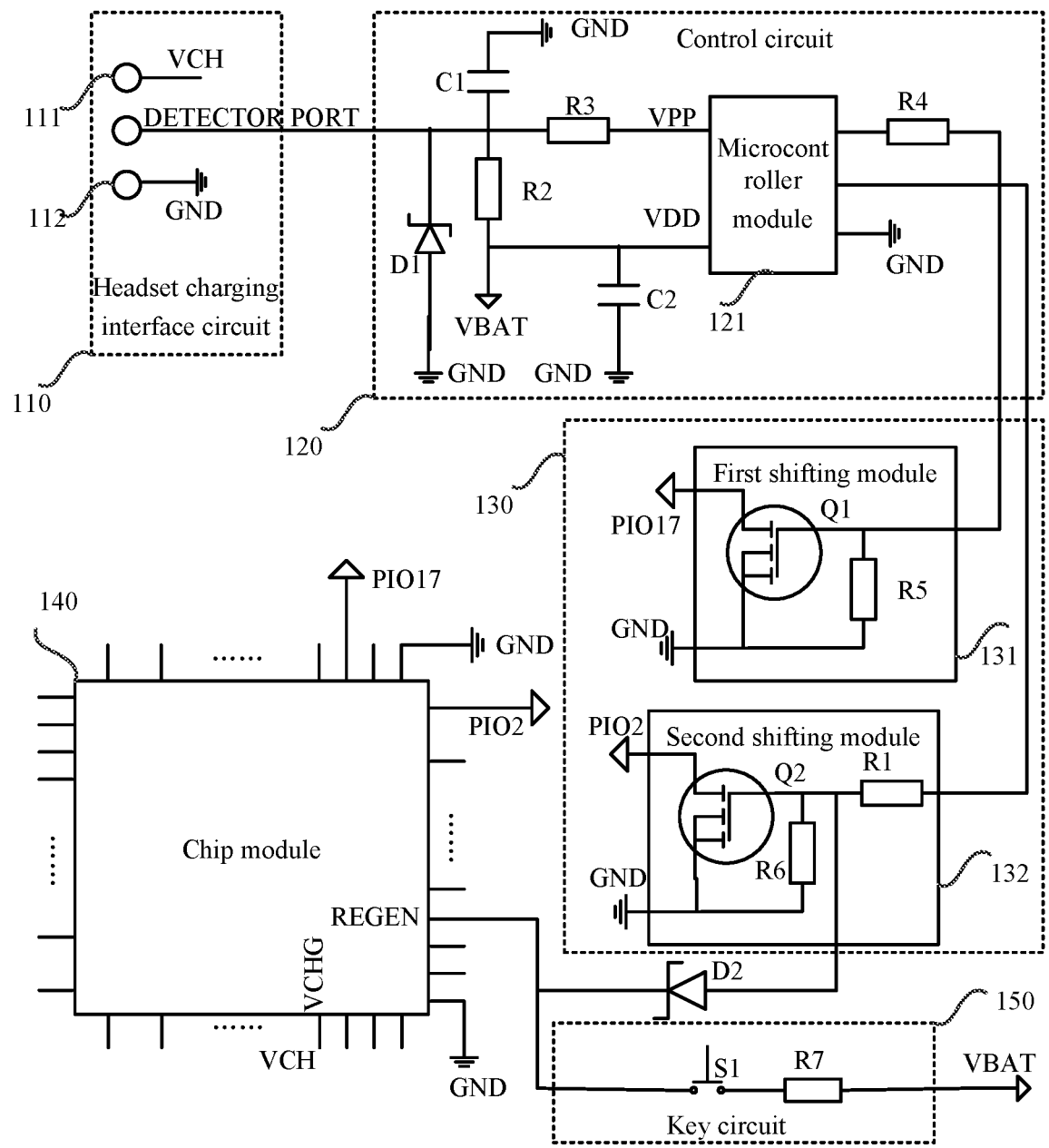
FIG. 4 is a structural diagram of a BLUETOOTH headset according to an example of the present disclosure.

Take a True Wireless Stereo (TWS) BLUETOOTH headset as an example, as shown in FIG. 4, when the TWS BLUETOOTH headset is charged in the charging cabin, the detecting pin DETECTER PIN of the charging cabin may be connected to the detecting terminal DETECTOR PORT of the headset charging interface circuit 110 of the BLUETOOTH headset through the connector POGO PIN, so that the voltage of the detecting terminal DETECTOR PORT is shifted from the logic high-level voltage to the logic low-level voltage. The logic high-level voltage of the detecting terminal DETECTOR PORT may be generated by the power supply voltage terminal VBAT connected to a resistor R2, and the detecting terminal DETECTOR PORT may be connected to the microcontroller module 121 in the control circuit 120 through one or more resistors R3, such as being connected to a first pin VPP of the microcontroller module 121 so that the microcontroller module 121 may detect a shifting from the logic high-level voltage to the logic low-level voltage through the first pin VPP. When the shifting from the logic high-level voltage to the logic low-level voltage is detected, the first output terminal of the microcontroller module 121 may output the first level signal such as outputting a logic high-level signal of 5 seconds which may be transmitted to the first shifting module 131 in the level shifting circuit through a resistor R4, that is, being transmitted to a gate electrode of the first transistor Q1 (i.e., the second terminal of the first transistor Q1), so that a drain electrode of the first transistor Q1 (i.e., the first terminal of the first transistor Q1) in the first shifting module 131 is turned on to connected to the reference ground GND of the BLUETOOTH headset, thereby generating a power-off signal, such as generating a logic low-level signal of 5 seconds, and then the first receiving pin PIO17 of the chip module 140 may detect the logic low-level signal of 5 seconds and perform the power off action of the BLUETOOTH headset. In one embodiment, the gate electrode of the first transistor Q1 may be connected to the reference ground GND of the BLUETOOTH headset through one or more resistors R5, which is not limited in the example.

When the TWS BLUETOOTH headset is lifted from the charging cabin, the detecting terminal DETECTOR PORT of the headset charging interface circuit 110 may be connected to the power supply voltage terminal VBAT of the BLUETOOTH headset through the resistor R2 in the control circuit 120, so that the voltage of the detecting terminal DETECTOR PORT may be pulled high by the power supply voltage terminal VBAT. That is, the voltage of the detecting terminal DETECTOR PORT may be shifted from the logic low-level voltage to the logic high-level voltage. After detecting the shifting of the voltage of the detecting terminal DETECTOR PORT from the logic low-level voltage to the logic high-level voltage through the first pin VPP, the microcontroller module 121 may output the second level signal through the second output terminal, such as outputting a logic high-level signal of 3 seconds, and the second level signal may be transmitted to the second shifting module 132 in the level shifting circuit 130. For example, through the current-limiting resistor R1 in the second shifting module 132, the second level signal is transmitted to the second transistor Q2 in the second shifting module 132. That is, the second level signal is transmitted to a gate electrode of the second transistor Q2 (i.e., the first terminal of the second transistor Q2), so that the second transistor Q2 is turned on and a power-on signal is generated. Specifically, after a drain electrode D of the second transistor Q2 (i.e., the second terminal of the second transistor Q2) is turned on to connect to the reference ground GND of the BLUETOOTH headset, the second receiving pin PIO2 of the chip module 140 may detect the logic low-level signal of 3 seconds, the detected logic low-level signal of 3 seconds may be taken as the power-on signal, and the power on action is performed according to the power-on signal, so that an automatic power on function of the BLUETOOTH headset is achieved. In one embodiment, the gate electrode of the second transistor Q2 may be connected to the reference ground GND of the BLUETOOTH headset through one or more resistors R6, which is not limited in the example.

Further, the first capacitor voltage-stabilizing sub-module 1221 in the present disclosure may include one or more capacitors, such as a capacitor C1 shown in FIG. 4, and the one or more capacitors may be specifically used for preventing instantaneous jitter of the headset charging interface circuit and a charging cabin charging interface to stabilize the voltage of the detecting terminal DETECTOR PORT of the headset charging interface circuit of the BLUETOOTH headset. In one embodiment, the second capacitor voltage-stabilizing sub-module 1222 may include one or more capacitors, such as a capacitor C2 shown in FIG. 4, and the one or more capacitors may be used as decoupling capacitors of the microcontroller module to enhance the stability of the microcontroller module.

In addition, the anti-static diode module 123 may include one or more ESD diodes, such as an ESD diode D1 shown in FIG. 4. As shown in FIG. 4, a terminal of the ESD diode D1 may be connected to the reference ground of the BLUETOOTH headset, and a other terminal may be connected to the detecting terminal DETECTOR PORT of the headset charging interface circuit to effectively prevent external static electricity from damaging the BLUETOOTH headset.

In the present disclosure, optionally, the headset charging interface circuit 110 may further include a first charging terminal 111 and a second charging terminal 112. The first charging terminal 111 may be connected to a charging voltage pin VCHG of the chip module 140 and configured to connect to the power supply pin of the charging cabin. The second charging terminal 112 may be connected to the ground pin of the chip module 140 and configured to connect to the ground pin of the charging cabin. As shown in FIG. 4, the first charging terminal 111 may be connected to the charging voltage pin VCHG of the chip module 140 through a connection interface VCH, and may be specifically used for receiving the charging voltage outputted by the power supply pin of the charging cabin and the like. The second charging terminal 112 may be directly connected to the reference ground GDN of the BLUETOOTH headset and may be specifically used for receiving the ground voltage output by the ground pin of the charging cabin and the like.

Further, the key circuit 150 in the embodiment of the present disclosure may include a key S1 and a resistor R7. As shown in FIG. 4, the key circuit 150 may be connected to the power supply voltage terminal VBAT through the resistor R7 and to a third receiving pin REGEN of the chip module 140 through the key S1, so that when the user operates the key S1, the chip module 140 performs corresponding operations according to the operation signal correspondingly generated by the first voltage provided by the power supply voltage terminal VBAT and transmitted to the third receiving pin REGEN of the chip module 140, to meet the operation requirement of the user.

The diode isolation circuit in the present disclosure may include one or more diodes, such as a diode D2 shown in FIG. 4. A terminal of the diode D2 is connected to the gate electrode of the second transistor Q2 in the second shifting module, another terminal of the diode D2 is connected to the key S1 of the key circuit, and the diode D2 is used for preventing incorrect operations to the chip module 140 when a key action is performed on the level shifting circuit 130. Specifically, by operating the key S1, the corresponding operation signal may be received by the third receiving pin REGEN of the chip module 140. Based on functions set by the software (such as answering and hanging up a phone, suspending and playing music, etc.) the chip module 140 is enabled to achieve the corresponding operation according to the operation signal. The diode D2 is provided with a unidirectional turning on function. When the user operates the key S1, a logic high-level signal connected to the VBAT through the R7 cannot turn on the first transistor Q1 and the second transistor Q2 through a D5. That is, a high-to-low level shifting is not detected by the first receiving pin PIO17 and the second receiving pin PIO2 of the chip module 140, thereby ensuring that the chip module 140 may perform actions in a function list of the BLUETOOTH headset, such as answering and hanging up the phone and suspending and playing music, etc.

In summary, in the present disclosure, after the detecting terminal of the headset charging interface is connected to the detecting pin of the charging cabin, the automatic power off of the BLUETOOTH headset may be achieved through the chip module of the BLUETOOTH headset, solving the problem that the BLUETOOTH headset is accidently powered on when the charging voltage provided by the charging cabin is insufficient.

It should be noted that, the charging cabin in the embodiment of the present disclosure may not only charge the BLUETOOTH headset, but also place the BLUETOOTH headset to facilitate storing the BLUETOOTH headset for the user.

Figure 5:
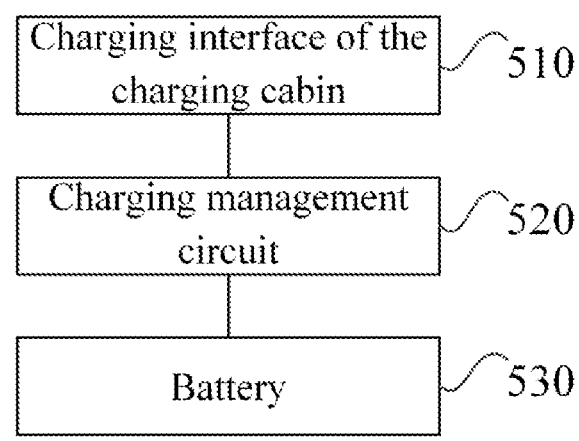
FIG. 5 is a structural block diagram of a charging cabin of a BLUETOOTH headset provided by the present disclosure.

Referring to FIG. 5, it is a structural block diagram of a charging cabin of a BLUETOOTH headset according to an embodiment of the present disclosure. The charging cabin of the BLUETOOTH headset may include: a charging interface of the charging cabin 510, a charging management circuit 520 and a battery 530. The charging interface of the charging cabin includes a detecting pin 511, a power supply pin 512 and a ground pin 513, where the detecting pin 511 is configured to connect to a detecting terminal of the BLUETOOTH headset, the power supply pin 512 is configured to connect to a first charging terminal of the BLUETOOTH headset, and the ground pin 513 is configured to connect to a second charging terminal of the BLUETOOTH headset. A terminal of the charging management circuit 520 is connected to a positive electrode of the battery 530, and another terminal of the charging management circuit 520 is connected to the power supply pin 513, so as to output a charging voltage to the power supply pin 511 when the detecting pin 511 is connected to the detecting terminal of the BLUETOOTH headset.

For example, after the BLUETOOTH headset is placed in the charging cabin, the detecting terminal of the headset charging interface circuit of the BLUETOOTH headset may be connected to the detecting pin 511 of the charging cabin, so that the charging management circuit 520 may output a charging voltage to the power supply pin of the charging interface of the charging cabin 510 based on current remaining capacity of battery. For example, the voltage of the power supply pin 512 is controlled to be a charging voltage of 5V, the BLUETOOTH headset is charged based on the charging voltage of 5V. Of course, when the detecting terminal of the headset charging interface circuit of the BLUETOOTH headset is not connected to the detecting pin 511 of the charging cabin, such as after the BLUETOOTH headset leaves the charging cabin, the charging management circuit 520 may stop outputting the charging voltage to the power supply pin 513, that is, the voltage of the power supply pin 513 is not required to be kept at the charging voltage of 5V, so as not to consume the battery power in the charging cabin.

It can be seen that, in the present disclosure, the charging cabin outputs the charging voltage to the power supply pin 512 when the detecting pin 511 is connected to the detecting terminal of the BLUETOOTH headset, and may not provide an output to the power supply pin 512 when the detecting pin 511 is not connected to the detecting terminal of the BLUETOOTH headset, thereby greatly reducing a power self-consumption of the charging cabin.

Figure 6:
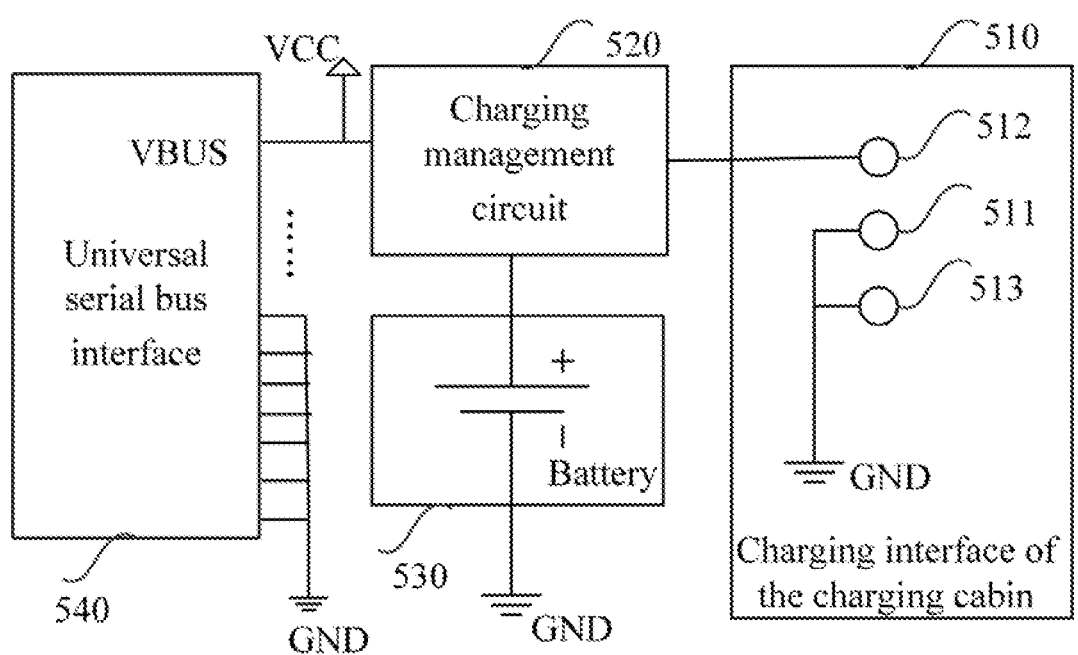
FIG. 6 is a structural diagram of a charging cabin of a BLUETOOTH headset according to another embodiment of the present disclosure.

In an embodiment of the present disclosure, the charging cabin further includes: a universal serial bus (USB) interface 540. As shown in FIG. 6, a voltage terminal VBUS of the universal serial bus interface 540 is connected to the charging management circuit 520, a ground terminal of the universal serial bus interface 540 is connected to the reference ground GND of the charging cabin. The detecting pin 511 and ground pin 513 of the charging interface of the charging cabin 510 and a negative electrode of the battery 530 may all be connected to the reference ground GND of the charging cabin. A positive electrode of the battery 530 may be connected to the charging management circuit 520. Further, the voltage terminal VBUS of the universal serial bus interface 540 may be connected to a power supply terminal VCC of the charging cabin, which is not limited in the embodiments of the present disclosure.

In a specific implementation, when the detecting terminal of the headset charging interface circuit of the BLUETOOTH headset is connected to the detecting pin 511 of the charging cabin, the charging management circuit 520 may detect whether the BLUETOOTH headset is fully charged. If the BLUETOOTH headset is detected to already be fully charged, based on a preset boost charging mode in the charging management circuit 520, the charging voltage is stopped to be output to the power supply pin 512 of the charging interface of the charging cabin. That is, the charging is automatically turned off, thereby reducing the self power consumption of the charging cabin. If the BLUETOOTH headset is detected not to be fully charged, the BLUETOOTH headset is determined to be charged, and then based on the preset boost charging mode in the charging management circuit 520, the charging voltage is output to the power supply pin 512 of the charging interface of the charging cabin, so that the voltage of the power supply pin 512 reaches the charging voltage to charge the BLUETOOTH headset based on the charging voltage until the BLUETOOTH headset is fully charged.

It should be noted that, the charging management circuit 520 may charge the BLUETOOTH headset placed in the charging cabin by using one or more boost charging modes. The embodiments of the present disclosure do not specifically limit the boost charging mode used by the charging management circuit 520. For example, after the charging cabin is connected to the power supply device through the USB interface, the charging management circuit 520 may charge the BLUETOOTH headset placed in the charging cabin and/or the battery 530 in the charging cabin and so on, based on the power provided by the power supply device.

Figure 7:
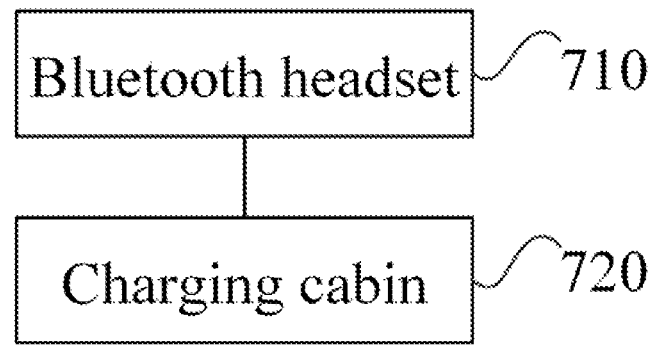
FIG. 7 is a structural block diagram of a charging system of a BLUETOOTH headset p the present disclosure.

On the basis of the above embodiments, the present disclosure further provides a charging system of a BLUETOOTH headset. As shown in FIG. 7, the charging system of the BLUETOOTH headset may include: a BLUETOOTH headset 710 and a charging cabin 720. The BLUETOOTH headset 710 may include any one of the BLUETOOTH headsets described in the above embodiments. The charging cabin 720 may include any one of the charging cabins described in the above embodiments. When the detecting pin of the charging cabin 720 is connected to the detecting terminal of the BLUETOOTH headset 710, the charging management circuit of the charging cabin 720 may output the charging voltage to the power supply pin of the charging cabin.

It should be noted that, embodiments in the specification are described in a progressive manner. Each embodiment focuses on differences from other embodiments. The same or similar parts in the embodiments can be referred to by each other. For example, for embodiments of the system, the description is relatively simple, and a description of embodiments of the BLUETOOTH headset and/or the charging cabin may be referred to for relevant details.

From the above description of embodiments, it will be apparent to those skilled in the art that the present disclosure may be implemented by means of software and necessary general-purpose hardware, or may of course be implemented by hardware, but in many cases the former is a preferred embodiment. Based on this understanding, the solution provided by the present disclosure substantially, or the part contributing to the related art, may be embodied in the form of a software product. The computer software product may be stored in a computer readable storage medium, such as a computer floppy disk, read-only memory (ROM), random access memory (RAM), a flash, a hard disk, an optical disk or the like, and includes several instructions for enabling a computer device (which may be a robot, a personal computer, a server or a network device) to execute the charging method of the BLUETOOTH headset according to any embodiment of the present disclosure.

It should be noted that, units and modules included in the above-mentioned BLUETOOTH headset and the charging cabin thereof are just divided according to functional logic, and are not limited to the division, as long as the corresponding functions can be implemented. In addition, specific names of functional units are just intended to distinguish, and not to limit the protection scope of the present disclosure.

It should be understood that each part of the present disclosure may be implemented by hardware, software, firmware or a combination thereof. In the above-mentioned embodiments, multiple steps or methods may be implemented by software or firmware stored in a memory and executed by a suitable instruction execution system. For example, if hardware is used for implementation, as in another embodiment, any one or a combination of the following technologies well known in the art can be used for implementation: discrete logic circuits having logic gate circuits used for implementing logic functions on data signals, application-specific integrated circuits having suitable combinational logic gates, programmable gate arrays (PGA), field programmable gate arrays (FPGA), etc.

In the description of the specification, the description of reference terms "an embodiment", "some embodiments", "example", "specific example", or "some examples" and the like means a specific characteristic, a structure, a material or a feature described in connection with the embodiment or the example are included in at least one embodiment or example of the present disclosure. The appearances of the above terms in various places in the specification are not necessarily all referring to the same embodiment or example. Moreover, the described specific characteristics, structures, materials or features may be combined properly in one or more embodiments or examples.

What is claimed is:

1. A BLUETOOTH headset, comprising: a headset charging interface circuit, a control circuit, a level shifting circuit and a chip module;
   wherein the headset charging interface circuit comprises a detecting terminal, the detecting terminal is connected to a power supply voltage terminal of the BLUETOOTH headset through the control circuit and connectable to a detecting pin of a charging cabin;
   when the detecting terminal is not connected to the detecting pin of the charging cabin, a voltage of the detecting terminal is a first voltage provided by the power supply voltage terminal;
   when the detecting terminal is connected to the detecting pin of the charging cabin, the voltage of the detecting terminal is shifted from the first voltage to a second voltage provided by the detecting pin to trigger the control circuit to output a first level signal to the level shifting circuit; and
   wherein the level shifting circuit is configured to shift the first level signal to a power-off signal, transmit the power-off signal to the chip module, and trigger the chip module to power off the BLUETOOTH headset according to the power-off signal.

2. The BLUETOOTH headset according to claim 1, wherein the control circuit is configured to detect the voltage of the detecting terminal, and configured to output a second level signal to the level shifting circuit when the detected voltage of the detecting terminal is the first voltage;
   wherein the level shifting circuit is configured to shift the second level signal to a power-on signal and transmit the power-on signal to the chip module; and
   wherein the chip module is configured to turn on the BLUETOOTH headset according to the switch-on signal when the BLUETOOTH headset is turned off.

3. The BLUETOOTH headset according to claim 2, wherein the control circuit comprises a microcontroller module, and the level shifting circuit comprises a first shifting module and a second shifting module;
   wherein a terminal of the first shifting module is connected to a first output terminal of the microcontroller module, and another terminal of the first shifting module is connected to a first receiving pin of the chip module, and the first shifting module is configured to shift the first level signal output by the first output terminal to the power-off signal and transmit the power-off signal to the first receiving pin of the chip module; and
   wherein a terminal of the second shifting module is connected to a second output terminal of the microcontroller module and another terminal of the second shifting module is connected to a second receiving pin of the chip module, and the second shifting module is configured to shift the second level signal output by the second output terminal to the power-on signal and transmit the power-on signal to the second receiving pin of the chip module.

4. The BLUETOOTH headset according to claim 3, wherein the control circuit further comprises a capacitor voltage-stabilizing module and an anti-static diode module;
   wherein a terminal of the anti-static diode module is connected to the detecting terminal of the headset charging interface circuit, and another terminal of the anti-static diode module is connected to a reference ground of the BLUETOOTH headset;
   wherein the capacitor voltage-stabilizing module comprises a first capacitor voltage-stabilizing sub-module and a second capacitor voltage-stabilizing sub-module;
   wherein a terminal of the first capacitor voltage-stabilizing sub-module is connected to the detecting terminal of the headset charging interface circuit and another terminal of the first capacitor voltage-stabilizing sub-module is connected to the reference ground of the BLUETOOTH headset, so as to stabilize the voltage of the detecting terminal; and
   wherein an terminal of the second capacitor voltage-stabilizing sub-module is connected to the reference ground of the BLUETOOTH headset, and another terminal of the second capacitor voltage-stabilizing sub-module is connected to the power supply voltage terminal of the BLUETOOTH headset and a power supply input terminal of the microcontroller module, so as to stabilize a voltage of the power supply input terminal of the microcontroller module.

5. The BLUETOOTH headset according to claim 4, further comprising a key circuit and a diode isolation circuit;
   a terminal of the diode isolation circuit is connected to the second shifting module, and another terminal of the diode isolation circuit is connected to the key circuit and a third receiving pin of the chip module; and a terminal of the key circuit is connected to the power supply voltage terminal of the BLUETOOTH headset, and another terminal of the key circuit is connected to the third receiving pin of the chip module.

6. The BLUETOOTH headset according to claim 2, wherein the first shifting module comprises a first transistor, wherein a first terminal of the first transistor is connected to the first output terminal of the microcontroller module, a second terminal of the first transistor is connected to the first receiving pin of the chip module, and a third terminal of the first transistor is connected to the reference ground of the BLUETOOTH headset;

wherein the second shifting module comprises a second transistor and a current-limiting resistor;

wherein a terminal of the current-limiting resistor is connected to the first output terminal of the microcontroller module, and another terminal of the current-limiting resistor is connected to a first terminal of the second transistor; and wherein a second terminal of the second transistor is connected to the second receiving pin of the chip module, and a third terminal of the second transistor is connected to the reference ground of the BLUETOOTH headset.

7. The BLUETOOTH headset according to claim 2, wherein the headset charging interface circuit further comprises a first charging terminal and a second charging terminal;

wherein the first charging terminal is connected to a charging voltage pin of the chip module and a power supply pin of the charging cabin; and wherein the second charging terminal is connected to a grounding pin of the chip module and a grounding pin of the charging cabin.

8. The BLUETOOTH headset according to claim 2, wherein the first voltage is higher than the second voltage.

9. The BLUETOOTH headset according to claim 3, further comprising a key circuit and a diode isolation circuit;

a terminal of the diode isolation circuit is connected to the second shifting module, and another terminal of the diode isolation circuit is connected to the key circuit and a third receiving pin of the chip module; and a terminal of the key circuit is connected to the power supply voltage terminal of the BLUETOOTH headset, and another terminal of the key circuit is connected to the third receiving pin of the chip module.

10. The BLUETOOTH headset according to claim 3, wherein the first shifting module comprises a first transistor, wherein a first terminal of the first transistor is connected to the first output terminal of the microcontroller module, a second terminal of the first transistor is connected to the first receiving pin of the chip module, and a third terminal of the first transistor is connected to the reference ground of the BLUETOOTH headset;

wherein the second shifting module comprises a second transistor and a current-limiting resistor;

wherein a terminal of the current-limiting resistor is connected to the first output terminal of the microcontroller module, and another terminal of the current-limiting resistor is connected to a first terminal of the second transistor; and wherein a second terminal of the second transistor is connected to the second receiving pin of the chip module, and a third terminal of the second transistor is connected to the reference ground of the BLUETOOTH headset.

11. The BLUETOOTH headset according to claim 3, wherein the headset charging interface circuit further comprises a first charging terminal and a second charging terminal;

wherein the first charging terminal is connected to a charging voltage pin of the chip module and a power supply pin of the charging cabin; and wherein the second charging terminal is connected to a grounding pin of the chip module and a grounding pin of the charging cabin.

12. The BLUETOOTH headset according to claim 3, wherein the first voltage is higher than the second voltage.

13. The BLUETOOTH headset according to claim 4, wherein the first shifting module comprises a first transistor, wherein a first terminal of the first transistor is connected to the first output terminal of the microcontroller module, a second terminal of the first transistor is connected to the first receiving pin of the chip module, and a third terminal of the first transistor is connected to the reference ground of the BLUETOOTH headset;

wherein the second shifting module comprises a second transistor and a current-limiting resistor;

wherein a terminal of the current-limiting resistor is connected to the first output terminal of the microcontroller module, and another terminal of the current-limiting resistor is connected to a first terminal of the second transistor; and wherein a second terminal of the second transistor is connected to the second receiving pin of the chip module, and a third terminal of the second transistor is connected to the reference ground of the BLUETOOTH headset.

14. The BLUETOOTH headset according to claim 4, wherein the headset charging interface circuit further comprises a first charging terminal and a second charging terminal;

wherein the first charging terminal is connected to a charging voltage pin of the chip module and a power supply pin of the charging cabin; and wherein the second charging terminal is connected to a grounding pin of the chip module and a grounding pin of the charging cabin.

15. The BLUETOOTH headset according to claim 4, wherein the first voltage is higher than the second voltage.

16. The BLUETOOTH headset according to claim 1, wherein the headset charging interface circuit further comprises a first charging terminal and a second charging terminal;

wherein the first charging terminal is connected to a charging voltage pin of the chip module and a power supply pin of the charging cabin; and wherein the second charging terminal is connected to a grounding pin of the chip module and a grounding pin of the charging cabin.

17. The BLUETOOTH headset according to claim 1, wherein the first voltage is higher than the second voltage.

18. A charging system of a BLUETOOTH headset, comprising:

a BLUETOOTH headset and a charging cabin;

wherein the BLUETOOTH headset comprises: a headset charging interface circuit, a control circuit, a level shifting circuit and a chip module;

wherein the headset charging interface circuit comprises a detecting terminal, the detecting terminal is connected to a power supply voltage terminal of the BLUETOOTH headset through the control circuit and connectable to a detecting pin of a charging cabin;

when the detecting terminal is not connected to the detecting pin of the charging cabin, a voltage of the detecting terminal is a first voltage provided by the power supply voltage terminal;

when the detecting terminal is connected to the detecting pin of the charging cabin, the voltage of the detecting terminal is shifted from the first voltage to a second voltage provided by the detecting pin to trigger the control circuit to output a first level signal to the level shifting circuit;

wherein the level shifting circuit is configured to shift the first level signal to a power-off signal, transmit the power-off signal to the chip module, and trigger the chip module to power off the BLUETOOTH headset according to the power-off signal;

wherein the charging cabin comprises: a charging interface of the charging cabin, a charging management circuit, and a battery;

wherein the charging interface of the charging cabin comprises a detecting pin, a power supply pin and a grounding pin, wherein the detecting pin is configured to connect to a detecting terminal of the BLUETOOTH headset, the power supply pin is configured to connect to a first charging terminal of the BLUETOOTH headset, and the grounding pin is configured to connect to a second charging terminal of the BLUETOOTH headset;

wherein an terminal of the charging management circuit is connected to a positive electrode of the battery, and another terminal of the charging management circuit is connected to the power supply pin, so as to output a charging voltage to the power supply pin when the detecting pin is connected to the detecting terminal of the BLUETOOTH headset; and when the detecting pin of the charging cabin is connected to the detecting terminal of the BLUETOOTH headset, the charging management circuit of the charging cabin is configured to output the charging voltage to the power supply pin of the charging cabin.

* * * * *